April 20, 1948.  E. H. BROOKS  2,440,139
COTTON CLEANING APPARATUS
Original Filed June 7, 1945   2 Sheets-Sheet 1

INVENTOR.
EUGENE H BROOKS
BY
ATTORNEY

April 20, 1948.  E. H. BROOKS  2,440,139
COTTON CLEANING APPARATUS
Original Filed June 7, 1945   2 Sheets-Sheet 2

INVENTOR.
EUGENE H. BROOKS
BY
ATTORNEY

Patented Apr. 20, 1948

2,440,139

UNITED STATES PATENT OFFICE 2,440,139

COTTON CLEANING APPARATUS

Eugene H. Brooks, Dallas, Tex., assignor to Continental Gin Company, a corporation of Delaware Original application June 7, 1945, Serial No. 598,095, now Patent No. 2,418,694, dated April 8, 1947. Divided and this application December 19, 1945, Serial No. 635,947

5 Claims. (Cl. 19—67)

REISSUED

This application is a division of my original application for Lint cotton cleaner, Serial No. 598,095, filed June 7, 1945, now Patent No. 2,418,694, dated April 8, 1947, and an object of the present invention is the provision of a lint cotton cleaning apparatus which shall be adapted to clean the cotton more effectively than has been thought possible heretofore.

A further object of my invention is to provide a lint cotton cleaner having a relatively large capacity and one which is effective to separate the trash, motes, and other foreign matter from the lint cotton without throwing out an excessive amount of lint with the foreign material thus removed.

A still further object of my invention is to provide a lint cleaning apparatus including a saw cylinder with stripper bars spaced relatively close together around the periphery of the saw cylinder so that the time interval of the passing of the lint cotton between bars is such that lint being carried around by the saw cylinder has time to flare away radially from the saw and be subjected to a beating action.

A still further object of my invention is to provide a lint cleaning apparatus including a saw cylinder, together with means to feed lint cotton to the saw cylinder in a manner to provide the maximum travel of lint on the saws, in combination with stripper bars at intervals extending longitudinally of the saw cylinder and in closely spaced relation to the periphery thereof.

In gathering cotton with mechanical pickers and when gathering after storms and late in the season, a large amount of dirt and trash is gathered with the cotton. Preliminary cleaning before ginning removes a large amount of this foreign matter, but there is still left a great amount of leaf, fine trash, and motes in such cotton after it is ginned. Heretofore in the art to which my invention relates, the cleaning of such seed cotton has taken place entirely before the lint cotton is separated from the seed. Various kinds of cleaners, hull separators, and combined cleaners and dryers, have been provided to remove all foreign material possible from the seed cotton before it is fed into the gin. The lint coming from the gin has heretofore gone through a condenser and then to a baling press, no effort being made at the gin house to further clean the lint cotton. While apparatus known as "re-gins" have been proposed for the renovation of damaged and off grade cotton after it has been baled and before it is spun, such apparatus has contemplated the treatment of the heavy masses or bats of cotton resulting from its having been baled, and have depended upon centrifugal force produced by the rotation of the re-gin saw cylinder to throw the foreign material out of the cotton, such force being aided by air currents, picker rolls and other devices. In no instance, so far as I am aware, has it been proposed to treat the lint cotton as it comes from the gin where it is separated from the seed, for the further separation of foreign material therefrom. By means of my invention, the lint cotton may be cleaned directly as it comes from the gins or it may be used, as will be pointed out hereafter, for cleaning lint cotton which has already been baled.

I have discovered that by taking the lint cotton from a condenser which forms it into a relatively wide, thin, uniform bat and passing it through my improved lint cleaning apparatus where it is subjected to successive beating as it is carried around by the saw cylinder, that I can effectively remove trash, motes, and other foreign material from the cotton and thus raise its grade and price materially. It will be obvious that my invention is particularly adapted for use with dirty, trashy, off grade cotton which would otherwise produce a poor sample and sell for a very low price. By the use of my improved method and apparatus, the grade of such cotton may be materially raised, its utility increased, and its price enhanced.

Apparatus embodying features of my invention is illustrated in the accompanying drawing, forming a part of this application, in which Fig. 1 is a diagrammatic plan view of an installation embodying my improved lint cleaning apparatus;

Figures 1, 2:
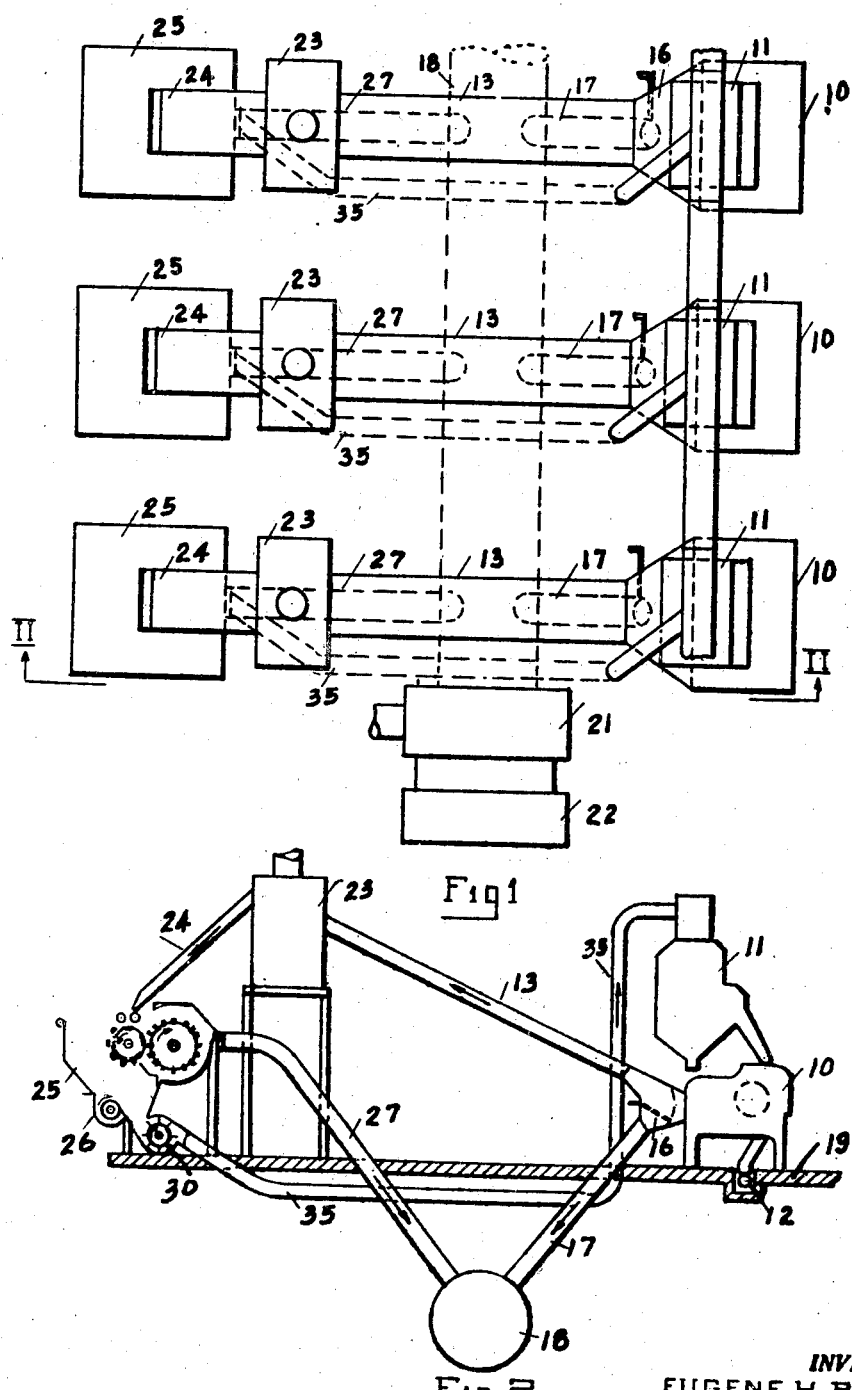
Fig. 2 is a diagrammatic sectional view looking in the direction II—II of Fig. 1.

Referring now to the drawings for a better understanding of my invention, I show in Figs. 1 and 2 a cotton gin installation embodying a battery of gins 10 to each of which seed cotton is fed from a combined cleaner and feeder 11. The gins 10 separate the seed from the lint cotton, delivering the seed at the bottom through the usual seed conveyor 12 and the lint to the rear of the gin. The lint cotton may pass out from the rear of the gin through a duct 13 to a condenser 23 or may be diverted by means of a vane 16 to a duct 17 leading to a lint flue 18 which may be disposed underneath the floor 19. Cotton which is clean as it comes from the field has the seed separated in the gin 10 and the lint from such cotton passes from the lint flue 18 to a battery condenser 21 and from thence to a press 22 without the intermediate treatment contemplated by my invention.

Where the cotton, as it comes from the field, is dirty or off-grade, the lint cotton from each of the gins 10 is directed by means of the vane 16 upwardly through the lint duct 13 to a condenser 23 where the air current conveying the cotton is separated from the lint and the lint is delivered in a relatively thin, wide, uniform bat onto a lint slide 24 leading to my improved lint cleaning apparatus. It will be seen from Fig. 1 that there is a condenser 23 for each gin and a lint cleaning apparatus 25 associated with each condenser 23. In the lint cleaning apparatus 25, the heavier remaining dirt, trash and foreign material is separated from the lint and is removed from the apparatus by a conveyor. Any fiber thrown off by the beating action passes downwardly into a blower 30 from which it is returned through a duct 35 to the seed cotton being fed to the gins 10, indicated diagrammatically to the combined cleaner and feeder 11. As shown in the drawing the blower 30 is of that type and is so operated that a very gentle current of air is produced thereby, the fiber being caught between the vanes thereof and discharged through the conduit 35. Further, the current is insufficient to draw the heavier particles away from the conveyor 26. It is thus subjected to a second treatment. The cleaned lint cotton from the cleaner 25 passes out through a duct 27 to the lint flue 18 and condenser 21 which delivers the cleaned lint to the press 22 as previously described.

Figure 3:
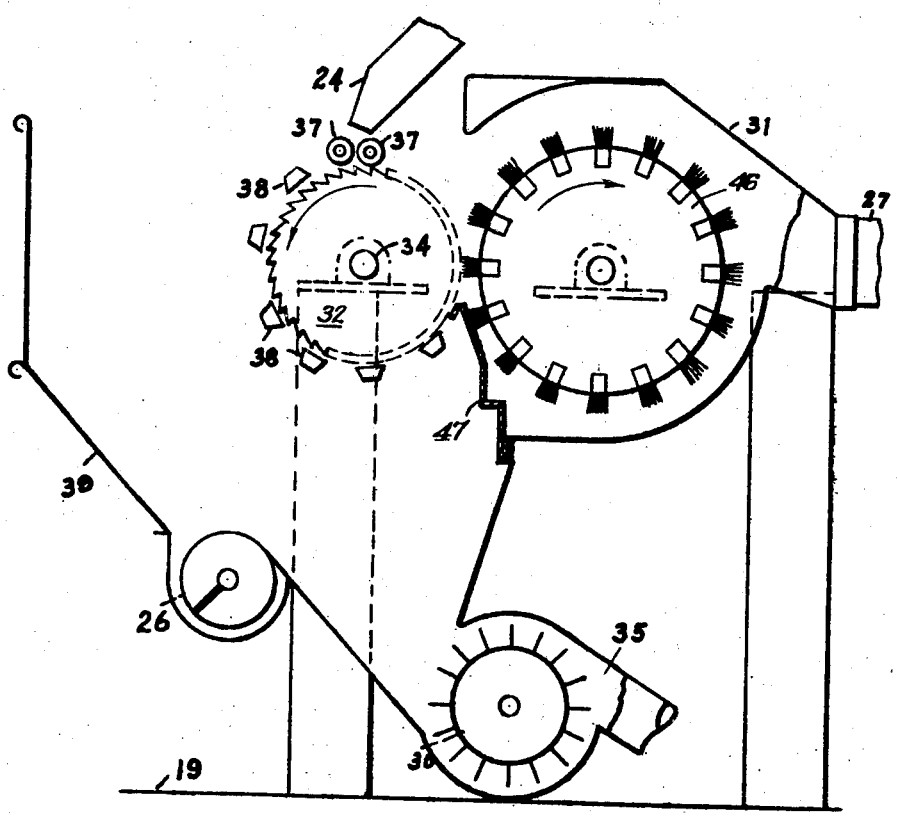
Fig. 3 is a sectional view of the lint cleaning apparatus.
Figure 4:
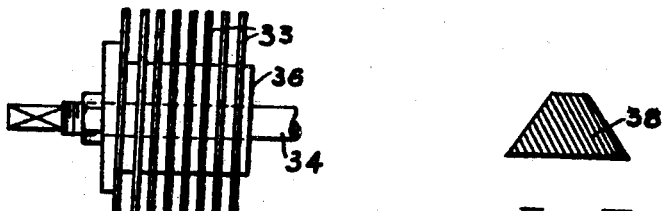
Fig. 4 is a detail view of the saw cylinder.
Figure 5:
Fig. 5 is a sectional view of one of the stripper bars.

Referring now particularly to Fig. 3, my improved lint cleaning apparatus comprises a relatively wide casing 31 open for the major portion of its width across the top. Disposed within the casing 31 is a saw cylinder 32 comprising individual saws 33 mounted on a shaft 34 at a slight inclination to the shaft and spaced apart by means of spacers 36. By setting the saws 33 as shown, they sweep the area where the cotton is being fed to the saws and the bat of cotton entering the cleaner through the slide 24 is engaged evenly the length of the saw cylinder and is not cut by the saws. Mounted above the saw cylinder 32 at the end of the slide 24 are a pair of feed rolls 37 which receive between them the cotton from the slide 24 and feed it to the saw cylinder 32. The feed rolls 37 are closely spaced with respect to the periphery of the saw cylinder, and are driven at a relatively high speed so that there can be no lapping over, or piling up of cotton in the lint slide 24 and the lint cotton is delivered to the saw cylinder 32 in a thin, uniform layer with no piling of fibers on the cylinder. Mounted within the casing 31 and extending parallel to the saw cylinder 32, in closely spaced relation thereto, are a plurality of stripper bars 38. The bars may be any suitable number and are disposed in spaced relation to each other, as shown in Fig. 3, about the periphery of the saw cylinder, it being contemplated that they shall be close enough to provide such a time interval of rotation of a given point on the saw cylinder between bars that the cotton fibers on the cylinder will flare outwardly and strike the bars, thus being subjected to successive beating actions. They are preferably angular in cross section as shown in Fig. 5 of the drawing, and are disposed, as shown in Fig. 3, to present an edge to the lint cotton being carried around by the saw cylinder.

The saw cylinder 32 is operated at a relatively high speed, say at a peripheral speed from 30% to 50% higher than the speed of the saw cylinder in the associated gin 10, so as to take the fibers from the feed rolls 37 in a thin, uniform layer. The heavier motes and foreign material carried by the lint cotton move outwardly of the periphery of the saw cylinder, due to centrifugal force, and strike the stripper bars 38, thus being subjected to a repeated beating action as they are carried around by the saw cylinder which separates them from the lint. It will be noted that the casing 31 is open over the saw cylinder 32 and that the adjacent side wall and bottom are widely spaced therefrom which prevents disturbing air currents and eddies from carrying light trash back to the saw cylinder. The heavier trash falls into the hopper-like bottom 39 and into the conveyor 26, already described. The escaping fiber falls into the casing of the blower 30 and is delivered back to the gins 10 for reworking as previously described.

On the opposite side of the casing 31 from the saw cylinder 32, I provide a brush cylinder 46 which is rotated in the direction indicated to remove the lint cotton from the saw cylinder 32 in a manner well understood. As shown in Fig. 3, a wall 47 separates the brush cylinder 46 from the lower part of the casing and extends upwardly into close proximity to the saw cylinder and prevents any motes or trash thrown out from the said cylinder from remixing with the cotton doffed by the brush cylinder. It will be seen that by rotating the saw cylinder in a direction to carry the incoming lint cotton away from the brush cylinder 46, I provide the maximum of travel for the lint cotton on the cylinder 32 and can provide a sufficient number of stripper bars 38 around the periphery of the saw cylinder to subject the lint cotton to a multiplicity of beating operations and effectively remove motes, trash and other foreign material therefrom. I have found as a result of repeated tests that this may be done with no substantial loss of lint cotton and that a material improvement in the grade thereof is obtained.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. A lint cotton cleaner comprising a rotary saw cylinder, a plurality of cleaning bars extending parallel to the long axis of the saw cylinder in relatively widely spaced relation to each other and in closely spaced relation to the saw cylinder, a pair of feed rollers mounted over the saw cylinder in closely spaced relation thereto and disposed to feed lint cotton in a relatively wide, uniform, thin bat to the saw cylinder to be carried around thereby and strike the cleaning bars, means to strip the lint from the saw cylinder, a casing for the cleaner having a hopper-like bottom, a trash conveyor disposed at one side in the bottom in the path of heavier motes and trash, and a blower in the bottom of the casing on the other side thereof disposed to remove escaping fiber therefrom.

2. Apparatus as set forth in claim 1 in which the cleaning bars are located alongside the saw cylinder in the direction toward which the cylinder rotates from the feed rolls, and in which a rotary brush is employed to strip the cotton from the saw cylinder on the side opposite the cleaning bars.

3. A lint cotton cleaner comprising a relatively wide casing, a saw cylinder mounted in the upper part of the casing in widely spaced relation to one wall thereof, and disposed to rotate with its upper surface moving toward the said wall, feed rolls mounted over the saw cylinder and adapted to feed cotton thereto in a relatively thin uniform bat, a plurality of cleaning bars extending parallel to the long axis of the saw cylinder on the side thereof toward said wall and in closely spaced relation to the saw cylinder, conveyor means for relatively heavy trash disposed within the lower part of the casing on the side of the saw cylinder toward said wall, means in the lower part of the casing on the other side thereof from said wall for removing lint thrown off by the saw cylinder from the casing, means to doff lint from the saw cylinder, and a wall separating the doffing means from the lower part of the casing.

4. A lint cotton cleaner comprising a rotary saw cylinder, a cleaning bar extending parallel to the long axis of the saw cylinder and disposed closely adjacent thereto, a pair of feed rollers mounted over the saw cylinder in closely spaced relation thereto and disposed to feed lint cotton in a relatively wide, uniform, thin bat to the saw cylinder to be carried around thereby and strike the cleaning bar, said bar causing the trash in the lint cotton striking the same to be thrown outwardly and downwardly of the saw cylinder, a casing embodying a wall spaced from the side of the cylinder toward which its upper surface rotates, there being an opening in the top of the casing between said spaced wall and the saw cylinder, means to doff lint from the saw cylinder after the same is carried around past the cleaning bar, an inwardly and downwardly sloping section on the lower end of the spaced wall, a trough joined to the lower portion of the sloping section and disposed to receive trash thrown against and sliding down the wall, a hopper like bottom for the casing embodying an inwardly and downwardly sloping wall section, the upper end of the wall section of the said hopper bottom being secured to the inner edge of said trough, and means to discharge from said hopper bottom light trash and escaping lint falling thereinto.

5. In a lint cotton cleaner embodying a casing, a rotating saw cylinder mounted in the upper part of the casing in spaced relation to one wall of the casing, feed rollers mounted closely adjacent the saw cylinder and disposed to feed lint cotton in a thin uniform bat to the saw cylinder to be carried around thereby, a cleaning bar extending parallel to the long axis of the saw cylinder and disposed to be struck by the lint carried around by the rotating saw cylinder thereby to remove trash from the lint, means cooperating with the saw cylinder to doff lint therefrom after the lint has struck the cleaning bar, means disposed in the bottom of the casing for removing lint and trash thrown off by striking the bar, and a wall separating the doffing means from the lower part of the casing.

EUGENE H. BROOKS.

REFERENCES CITED

The following references are of record in the file of this patent:

UNITED STATES PATENTS

| Number | Name | Date |
|---|---|---|
| 271,578 | Graner | Jan. 30, 1883 |
| 1,037,340 | Shaughnessy | Sept. 3, 1912 |
| 1,299,185 | Howorth | Apr. 1, 1919 |
| 1,658,731 | Mitchell | Feb. 7, 1928 |
| 1,963,260 | Conrad | June 19, 1934 |
| 1,963,262 | Deems | June 19, 1934 |
| 1,992,454 | Wallace | Feb. 26, 1935 |
| 2,238,055 | Hollerung et al. | Apr. 15, 1941 |